US005492309A

United States Patent [19]
Meierling et al.

[11] Patent Number: 5,492,309
[45] Date of Patent: Feb. 20, 1996

[54] CLOSED TILTABLE STEELWORKS ARC FURNACE WITH ASSOCIATED SCRAP CHARGING ASSEMBLY

[75] Inventors: Peter Meierling, Düsseldorf; Hans-Ludwig Schaller, Moers, both of Germany

[73] Assignee: Mannesmann Aktiengesellschaft, Düsseldorf, Germany

[21] Appl. No.: 309,805

[22] Filed: Sep. 21, 1994

[30] Foreign Application Priority Data

Sep. 23, 1993 [DE] Germany ................ 43 32 913.6

[51] Int. Cl.[6] .................. C21B 7/22; C21C 5/50
[52] U.S. Cl. .................. 266/156; 266/240; 266/242; 266/901
[58] Field of Search .................. 266/240, 242, 266/236, 156, 901; 373/9, 84, 73, 79

[56] References Cited

U.S. PATENT DOCUMENTS 3,684,261  8/1972  Wynne ................ 266/240
3,917,241  11/1975  Steffora et al. ............ 266/240
4,639,927  1/1987  Uno et al. ................ 373/84
4,852,858  8/1989  Weber .................... 266/901

*Primary Examiner*—Scott Kastler
*Attorney, Agent, or Firm*—Cohen, Pontani, Lieberman, Pavane

[57] ABSTRACT

A steelworks apparatus includes a closed tiltable arc furnace for melting scrap and having a lower vessel part for containing the melt and an upper vessel part connected to an exhaust gas assembly and closed by a furnace roof. A sealable charging assembly is formed of at least two stack-like storage containers which are connected at their top ends to the exhaust assembly and which include gas-permeable, scrap-retaining flaps that are movable between open and closed positions at the bottom end of each respective storage container. A compensation component is located connectingly between the storage containers and the lower furnace vessel part for accommodating relative movements of and between the furnace and storage containers while gas-tightly preventing leakage or escape of gases from between the relatively moved or shifted structures during or as a result of operative tilting of the furnace.

16 Claims, 3 Drawing Sheets

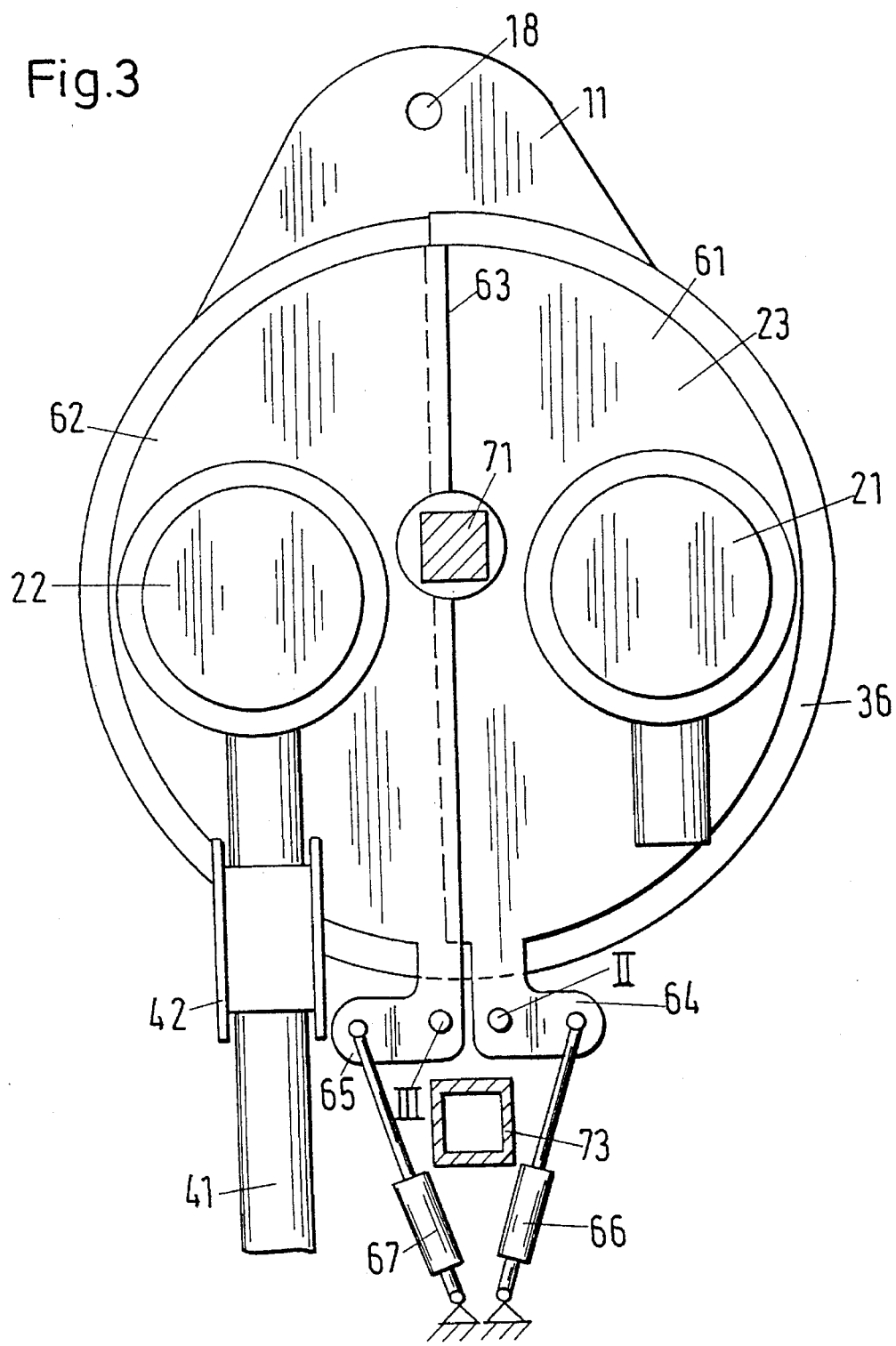
Fig.3

CLOSED TILTABLE STEELWORKS ARC FURNACE WITH ASSOCIATED SCRAP CHARGING ASSEMBLY

FIELD OF THE INVENTION

The present invention is directed to arc furnaces for the melting of scrap in a steelworks and, more particularly, to a steelworks apparatus which includes a closed tiltable arc furnace and an associated furnace charging assembly for the preheating and feeding of scrap material.

BACKGROUND OF THE INVENTION

A closed electric melting furnace having a device for batchwise charging and implemented by a hollow-cylinder rotational body is disclosed in German patent publication OS 28 51 734. The rotational body is, with the exception of a single outlet, closed so that furnace exhaust gases are unable to flow through charge scrap or material contained in the rotational body.

A device for preheating the charge material for electric melting furnaces in which containers mounted on the cover of an electric furnace have scraping devices that allow the charge material to enter the furnace is disclosed in German Patent No. PS 56 27 41. The tiltable furnace includes a cover on which scrap containers, fillable by hand or in conjunction with a conveyer belt, are mounted. This construction is, however, suitable for use with only the finest scrap material, such as steel chips and similar waste materials, and cannot be used for charging the furnace with or preheating the coarse scrap normally processed in the metallurgical industry.

An induction melting furnace with integrated charging shafts that are located in the furnace cover and to which a gas exhaust system is also attached is disclosed in German Patent No. PS 35 40 734. The charging shafts include prongs that interengage in the closed condition of the prongs and which serve as a braking device for cathode blanks that come off. Such non-generic charging shafts for cathodes, with their feeder table and charging flap, are neither appropriate for use with nor suggest a way of providing suitable storage containers for electric arc furnaces for melting scrap and in which the charge material is preheated.

OBJECTS AND SUMMARY OF THE INVENTION

It is accordingly the desideratum of the present invention to provide a steelworks apparatus or assembly in which a tiltable arc furnace may be charged, in an emission-free and energy-efficient manner without interrupting its normal operations, using scrap preheated directly by the furnace using the sensible heat of the furnace itself.

This and other objects are achieved in accordance with the invention by a steelworks apparatus in which scrap storage containers are mounted on both or opposite sides of the electrode carrying support on the shop platform or bay. The significant weights of the various components of the apparatus, and most particularly of the scrap-filled storage containers, are thus absorbed by the platform. The storage containers each include a gas-permeable bottom that is movable into a non-obstructing position for and during charging and which allows hot flue gases from the furnace to flow through the scrap material with which the containers are filled. A flue gas extraction assembly or construction is provided at the tops or upper ends of the storage containers so as to accommodate a complete and unobstructed flow of the flue gases through the columnar scrap storage containers.

Located between the storage containers and the furnace roof, or the storage containers connected to the furnace roof and the lower vessel portion of the furnace, is a compensation element or assembly. The compensation element accommodates tilting of the arc furnace, or of at least the lower vessel part or portion of the furnace relative to the upper vessel part or portion and/or the scrap storage containers, without the unintended or uncontrolled loss or leakage of flue gases into the atmosphere or steelworks surroundings. The compensation element or assembly thus operatively permits unobstructed forward and rearward tilting of the arc furnace or, at the very least, of the lower vessel portion of the furnace which is filled with the melt, without the loss of exhaust gases being channeled or directed to and/or through the scrap-containing storage containers. Such a compensation element or assembly may furthermore be employed in a modern melting shop operation incorporating a tiltable arc furnace having an eccentric bottom tapping without the occurrence of unintended emissions.

The required functionality of the compensation element may be reduced in accordance with the invention by similarly pivoting the storage containers concurrently with and during tilting of the furnace, or by a purposeful tilting movement of the arc furnace that is not produced by rolling on a roll-off track. The compensation element may, in any event, be implemented by a simple heat-resistant, gas-tight cloth which may as appropriate be protected in the furnace interior space by protection elements, as for example chains or chain link or mesh material, against splashing of the hot melt.

Other forms or parts or embodiments of the compensation elements are also disclosed. Metal compensators, for example, may be employed. In addition, elements that minimize lateral movement of the compensator may also be used.

In another advantageous compensation arrangement embodiment, a sand seal or fluid cup—i.e. a type of sealing element that has been employed with some success elsewhere in metallurgical operations—is employed. Such an arrangement permits relative movements of and between the components or structures connected by the compensation element while simultaneously preventing the emission of gases and/or dust at the pressure differences which typically exist within and between the furnace and the shop atmosphere.

In accordance with a preferred implementation, the furnace roof is divided into two wing-like sections that are respectively pivotable to open the upper furnace vessel portion for special occurrences or furnace inspections and the like. The sectional division of the roof may be along or in parallel or in axial alignment with the electrode-carrying arm of the apparatus and/or a vertical axis of the furnace.

The inventive placement and attachment of the storage containers to the furnace roof permit the scrap to be charged in an environmentally-friendly manner while maximally utilizing the heat energy of the furnace-generated flue gases. The storage containers are, during most of their and the furnace operating time, closed at their tops by stopping elements.

In use, a scrap basket filled with scrap material is placed above the slider on one of the storage containers; the stopping element is then opened and the scrap drops into the storage container to and atop the gas-permeable bottom.

During the scrap filling process, the scrap container or basket rests atop and seals the mouth of the storage container so that no unintended emissions of dust occur. The stopping element at the top of the storage container is then re-closed, permitting removal of the scrap basket. The scrap thus loaded into and contained within the storage container is heated by the flue gases generated by the furnace, and the furnace may thereafter be charged at any suitable or desired or convenient time by operatively opening the gas-permeable bottom of the storage container. Charging of the furnace accordingly takes place without obstruction and without interfering with the normal operation of the furnace; the closed, emission-proof furnace need not be opened at any point.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 3 is a top plan view of the roof of the tiltable arc furnace depicted in FIG. 1.

DETAILED DESCRIPTION OF THE PREFERRED EMBODIMENTS

Figure 1:
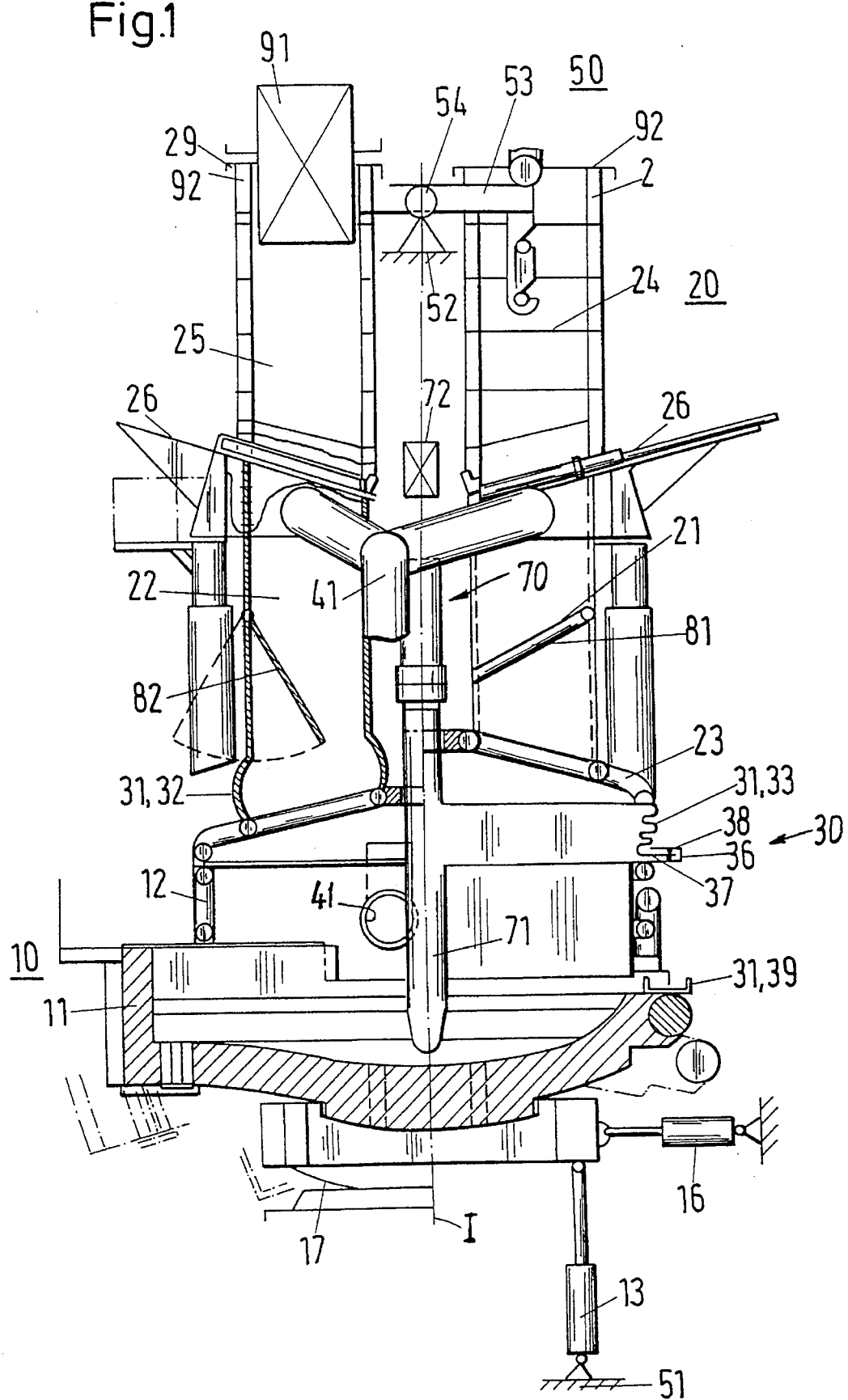
FIG. 1 is a side view of a tiltable arc furnace constructed in accordance with the teachings of the present invention.

A tiltable arc furnace 10 constructed in accordance with the present invention and formed of a lower vessel part or portion 11 lined with refractory-grade material and an upper vessel part or portion 12 is illustrated in FIG. 1. As seen in the lower lefthand portion of the drawing, the lower vessel part 11 sits supportedly on an operable filter 17; the lower righthand portion of FIG. 1 depicts a specific assembly for drawing, stopping and tilting the vessel part 11 and formed of at least three vertically-oriented piston cylinders 13 and a horizontally-oriented piston cylinder 16.

The general reference numeral 20 denotes the assembly by which charge—i.e. heated scrap material—is fed to the furnace 10. The assembly 20 includes a pair of elongated, vertically-extending storage containers 21, 22 located, as seen in FIG. 3 and hereinafter described, above openings defined in the furnace roof 23. Embodiments containing more than two storage containers are also within the scope and contemplation of the invention. Flue-gas pipes 41 for carrying the hot exhaust gases from the furnace are connected in gas-communicating arrangement to the storage containers 21, 22 and a shut-off element 26, operable for sealing or closing off the pipe 41 and the lower portion of the storage container from the ambient atmosphere, is provided in each storage container 21, 22 proximate its connection with the pipe 41 and upwardly (in the drawing) therefrom and from the furnace 10. The mouths 24, 25 of the respective storage containers 21, 22, defined on that side of the shut-off elements 26 remote from the furnace 10, carry sealing lips 29 configured for gas-tight sealing engagement with sealing counterlips 92 of a scrap basket 91 from which scrap material is introduced into the storage containers 21, 22.

The steelworks bay 50, the exact structure of which is neither pertinent to nor a feature of the present invention and is therefore not shown in detail, includes a positionally-fixed foundation 51 on which the vertical piston cylinders 13 rest (or to which they are secured) and a fixed platform 52 on which a support assembly 53 is carried. The support assembly 53 is connected to the storage containers 21, 22 or, as more particularly illustrated in FIG. 1, to or proximate the storage container mouths 24, 25. The support assembly 53 carries a bearing 54 for accommodating tilting and/or lateral shifting of the storage containers as the tiltable arc furnace is itself positionally or orientationally shifted.

The lower vessel part 11, which is at least indirectly supported on the foundation 51, and the storage containers 21, 22 which are suspended on or from the fixed platform 52, are connected by a substantially ring-shaped compensation element or assembly or component 30. The compensation component 30 is configured, in each of several herein-disclosed forms or portions, and/or is operable for accommodating shifts or changes in the relative positions and/or orientations of the furnace 10—or of at least the lower vessel part 11—and the storage containers 21, 22 resulting from tilting motions of the furnace or furnace part 11 while maintaining a gas-tight connection of the furnace and storage containers. In FIG. 1, the component 30 is shown implemented by compensation elements 31 in the form of a heat-resistant, gas-tight cloth—optionally combined or lined along its interior with metal mesh or chain or the like to prevent it from being damaged by slashing melt from the furnace interior—connecting the storage container 22 and the furnace roof 23. The component 30 is also depicted in FIG. 1 in the form of a metal compensator 33 disposed between the furnace roof 23 and the upper vessel part 12; another ring disk 37, extending into a ring sleeve 36 and sealed by a sealing ring 38, provides compensation in the horizontal direction. Finally, the component 30 is shown in FIG. 1 as a cup 39 located between the upper vessel part 12 and the lower vessel part 11.

Figure 2A:
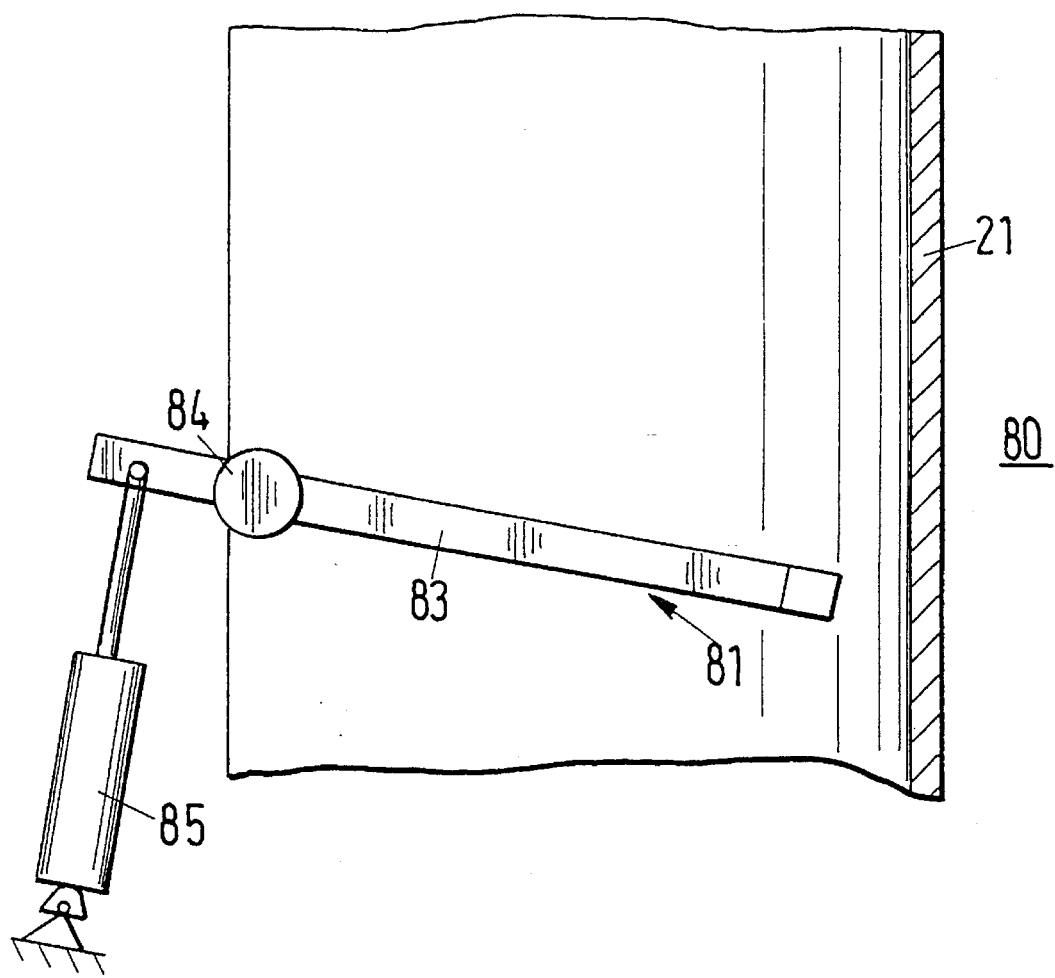
FIG. 2A is a sectional side view of the bottom portion of a storage container of the arc furnace of FIG. 1.
Figure 2B:
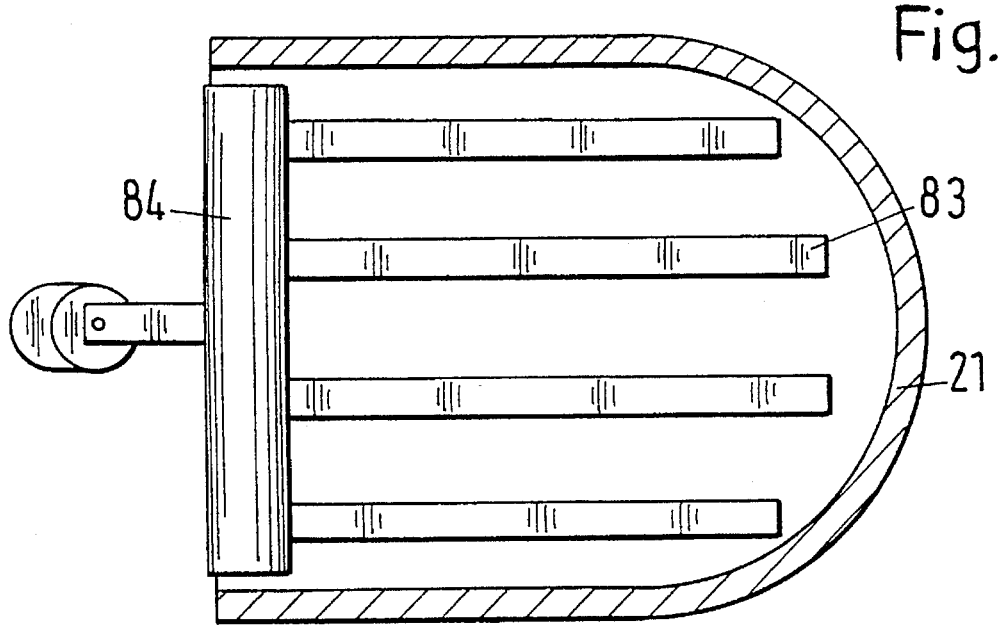
FIG. 2B is a top plan view of the storage container bottom portion depicted in FIG. 2A.

An electrode 71 of the arc furnace 10 is carried by an electrode carrying arm 72 of an electrode carrying assembly 70 so that the electrode, and at least a portion of the arm 72, extends along a substantially vertical axis I of the furnace. The bottom 80 of each storage container 21, 22 is provided with a respective scrap-retaining, bottom-defining flap 81, 82 which will now be described with specific reference to FIGS. 2A and 2B.

Each of the flaps 81, 82 is pivotally movable between an open position (see the position of flap 82 in FIG. 1) in which scrap contained within the respective storage container is permitted to gravitationally pass into the furnace 10 from the storage container, and a closed position (depicted by the flap 81 in FIGS. 1 and 2B) in which the scrap is captively retained in the storage container. The openable storage container bottom flap 81, by way of illustrated example, is supported by a pivot joint 84 about which the flap is movable between its open and closed positions by an operable drive 85. The flap 81 is formed in the herein-disclosed embodiment of a plurality of elongated arms or shafts or toggles 83 arranged in substantially parallel, spaced apart relation, the spacing between adjacent toggles 83 being predeterminately selected so as to be sufficient to prevent passage of the scrap through such inter-toggle spaces while permitting the ready and substantially unobstructed passage of gases therethrough.

FIG. 3 shows a top plan view of the furnace roof 23 formed of the roof parts or sections 61, 62, each having an opening substantially aligned with the lowermost extent of a respective one of the storage containers 21, 22 so as to permit heated scrap or charge from the storage containers to pass through the roof section openings into the furnace 10 when the flaps 81, 82 are in their open positions. The roof sections 61, 62 are of generally semi-circular configuration and, when disposed in the FIG. 3 furnace-closing position, overlap one above the other along the furnace longitudinal axis about a thus-defined separating line 63. In a preferred form of the invention, the roof sections 61, 62 are mountedly connected to or provided with turning knobs 64, 65 that are rotatable by drives 66, 67 about the axes II, III, respectively, for operatively pivoting the roof sections between their illustrated FIG. 3 position closing the furnace 10 and an open position (not shown) exposing the furnace interior for repairs or cleaning or other purposes. The radially-outer edge of each of the roof parts 61, 62 is defined by a ring sleeve 36.

The exhaust or flue gas pipe 41 is provided with a sliding or telescoping sleeve 42 for accommodating movements of the tiltable furnace 10. The exhaust pipe 41 is also connected, at or proximate its end opposite the storage containers 21, 22, to an extraction device or assembly 40 whose structure forms no part of the present invention and is not, accordingly, depicted in particular detail. Also seen in FIG. 3 is an eccentric portion of the top of the furnace lower vessel part 11, which includes a tapping hole 18 therein defined.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A steelworks apparatus, comprising:
   a closed tiltable arc furnace operable for melting metal scrap, said furnace comprising a lower vessel part and an upper vessel part defining a furnace interior, a furnace roof, an electrode extending into the upper vessel part, means for exhausting gases from the furnace interior, and means for feeding charge material into the furnace interior;
   said feeding means comprising a pair of tiltable storage containers mounted on the furnace for receiving and holding scrap to be heated and fed into the furnace interior; each said storage container having a bottom communicating with the furnace interior and a top opposite said bottom and said, each container being connected to said gas exhausting means intermediate said top and bottom for receiving exhaust gases from the furnace interior; a sealing device in each said storage container and operable for closing the container top against a release of exhaust gases from said top and for directing exhaust gases from said gas exhausting means toward the storage container bottom to heat scrap held in said container; a gas-permeable bottom-defining device proximate the bottom of each said storage container and operatively movable between a closed position in which the bottom-defining device prevents passage of scrap in said storage container through and beyond said device while permitting ready passage of gases through said device, and an open position in which scrap in said storage container is passable beyond said bottom-defining device and into the furnace interior; and
   compensation means disposed between said lower vessel part and said storage containers for accommodating relative positional and orientational changes of said lower vessel part and said storage containers as said arc furnace and said storage containers are operatively tilted while maintaining a gas-tight connection between said furnace interior and said storage containers.

2. A steelworks apparatus in accordance with claim 1, wherein said compensation means comprises a substantially ring-shaped element extending connectingly between said furnace roof and said upper vessel part.

3. A steelworks apparatus in accordance with claim 1, wherein said compensation means comprises a substantially ring-shaped, heat-resistant, gas-tight cloth extending between said furnace roof and said upper vessel part.

4. A steelworks apparatus in accordance with claim 1, wherein said compensation means comprises a substantially ring-shaped, metal compensator extending between said furnace roof and said upper vessel part.

5. A steelworks apparatus in accordance with claim 4, wherein said compensation means further comprises one of a substantially ring-shaped disk and sleeve attached to a mouth of said upper vessel part, and one of a substantially U-shaped ring sleeve and ring disk on said furnace roof and into which said substantially ring-shaped disk or sleeve is guidedly receivable.

6. A steelworks apparatus in accordance with claim 5, wherein said compensation means further comprises an elastic sealing ring disposed between one of said ring sleeve and said disk and said ring disk and said sleeve.

7. A steelworks apparatus in accordance with claim 1, wherein said furnace roof comprises a first section and a second section, each of said first and second sections being mounted for pivotal movement between a first position in which said first and second sections define a closed roof of said furnace and a second position in which at least a portion of said first and second sections are disposed in spaced apart relation so as to open said roof and provide access to said furnace interior.

8. A steelworks apparatus in accordance with claim 7, wherein said furnace further comprises an arm carrying said furnace electrode and extending substantially along an axis of said furnace, and wherein said first and second sections of said furnace roof are disposed in substantially overlapping relation along a separating line defined substantially parallel to said extension of the arm carrying said furnace electrode.

9. A steelworks apparatus in accordance with claim 1, wherein said compensation means comprises a substantially ring-shaped cup located between said lower vessel part and said upper vessel part.

10. A steelworks apparatus in accordance with claim 1, wherein said bottom-defining defining device comprises a plurality of spaced apart, elongated toggles, and means operable for moving said toggles between said closed and open positions of said bottom-defining device.

11. A steelworks apparatus in accordance with claim 1, wherein said bottom-defining device comprises a plurality of spaced apart, elongated toggles forming a gas-permeable flap, and means operable for moving the flap formed by said plural toggles between said closed and open positions of said bottom-defining device.

12. A steelworks apparatus in accordance with claim 1, wherein said apparatus is disposed in a positionally-fixed steelworks bay, said feeding means further comprising means supportingly connecting said storage containers to said steelworks bay for accommodating corresponding tilting movements of said storage containers as at least said lower vessel part is operatively tilted.

13. A steelworks apparatus in accordance with claim 12, wherein said furnace further comprises means for carrying said electrode, said feeding means further comprising means supportingly connecting said electrode carrying means to said steelworks bay for accommodating corresponding tilting movements of said electrode carrying means as at least said lower vessel part is operatively tilted.

14. A steelworks apparatus in accordance with claim 1, wherein each said storage container further comprises a mouth defined at the container top and having a sealing lip configured for engagement with a correspondingly-configured counterlip of a scrap basket receivable at said container mouth for feeding scrap from the scrap basket into said storage container.

15. A steelworks apparatus in accordance with claim 1, wherein said furnace further comprises at least a piston cylinder connected to said lower vessel part and operable for imparting tilting movements to said lower vessel part.

16. A steelworks apparatus in accordance with claim 1, wherein said furnace further comprises a plurality of horizontally and vertically oriented piston cylinders connected to said lower vessel and operable for imparting tilting movements to said lower vessel part.

* * * * *